Dec. 23, 1952 W. H. RYMES 2,623,116
RECORDING DEVICE
Filed Nov. 21, 1947 2 SHEETS—SHEET 1
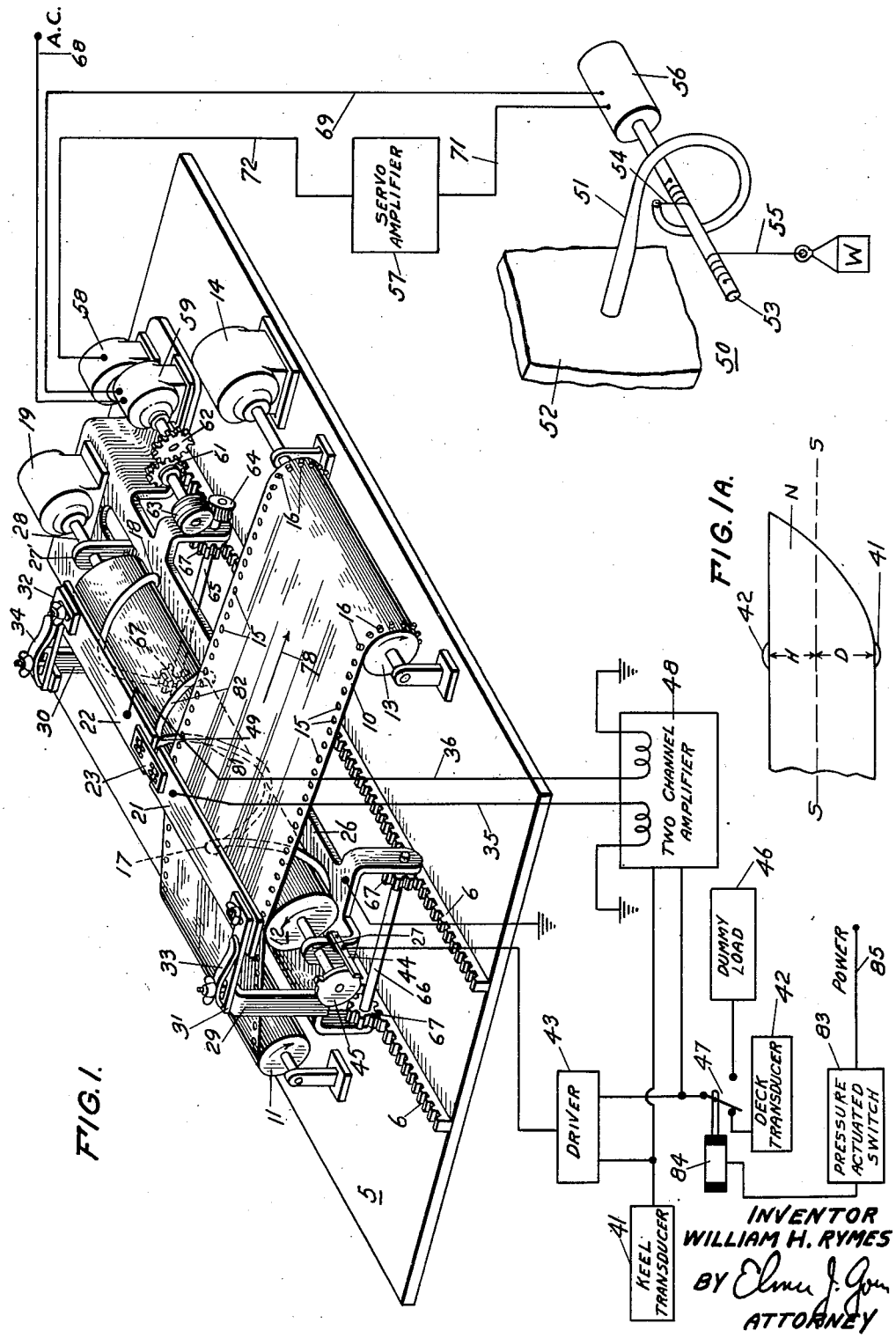
INVENTOR
WILLIAM H. RYMES
BY Elmer J. Gorn
ATTORNEY Dec. 23, 1952 W. H. RYMES 2,623,116
RECORDING DEVICE
Filed Nov. 21, 1947 2 SHEETS—SHEET 2
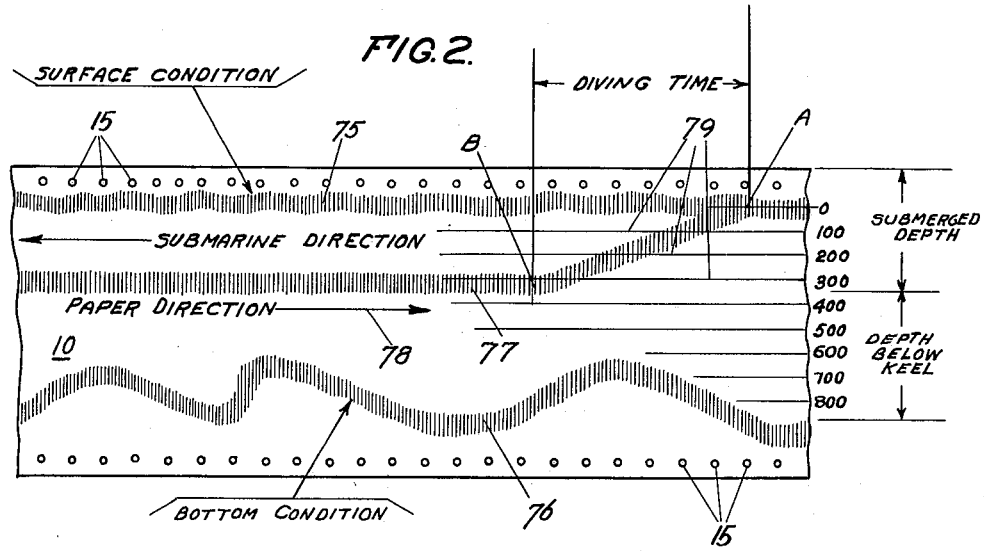
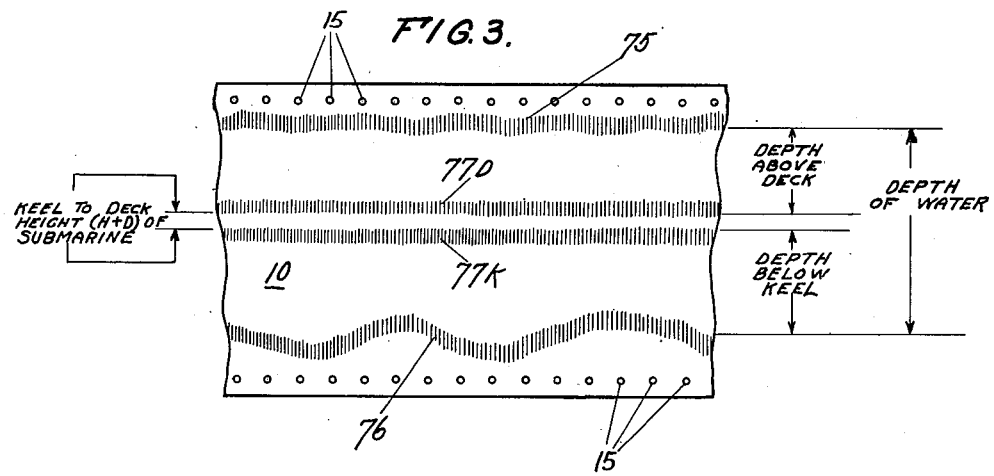
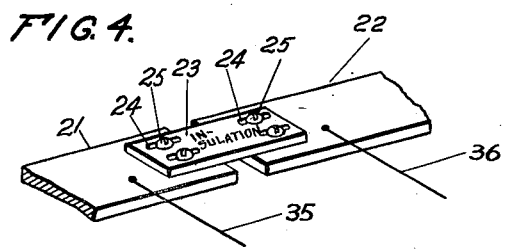
INVENTOR
WILLIAM H. RYMES
BY Elmer J. Gorn
ATTORNEY

Patented Dec. 23, 1952

2,623,116

UNITED STATES PATENT OFFICE 2,623,116

RECORDING DEVICE

William H. Rymes, Randolph, Mass., assignor to Raytheon Manufacturing Company, a corporation of Delaware Application November 21, 1947, Serial No. 787,279

25 Claims. (Cl. 177—386)

The present invention relates to water depth indicators for use on submarines, and particularly to an improved unitary indicator for use with sound ranging equipment for recording simultaneously the depth of water below and the height of water above a submarine.

It is known to sound the bottom of the water below a vessel by means of reflected pulses of sound waves emitted from the vessel and to record the information thus obtained on a moving record paper having depth record scales and indicia by means of a stylus or other marking means moving over the record paper at a controlled rate. A recorder having marking means including a printer bar and a stylus in the form of a spiral-shaped blade rotated to have one point at all times in contact with the paper, sometimes called a "lawnmower" type recorder, is illustrated in U. S. Patent No. 2,250,509. It is also known similarly to record the height of water above a submarine by the reflection from the surface of the water of sound wave pulses generated at the submarine and directed toward the surface. The records furnished by both of the above systems can be compared by a navigator, and from them can be deduced the vertical position in the water of the submarine, the total depth of the water, and the surface and bottom conditions. It is the primary object of the present invention to furnish all this information on a single record sheet, so that the information can be quickly and accurately provided, and to avoid the necessity of comparing separate records and deducing the information.

It is an additional object of the invention to provide a single apparatus which furnishes the above information.

It is a further object of the invention to provide in such an apparatus features which enable the apparatus to exhibit automatically the elevation track of the submarine through the water, together with the diving path and diving time when a dive is executed. The invention thus provides on a single record the elevation track of the submarine and the bottom contour and surface conditions of the ocean below and above the submarine, so that the record can be used as made for deducing the location of the submarine from a chart showing ocean depth and bottom conditions, and for deciding the advisability of surfacing. The record can be subsequently used to prepare depth charts of a new region travelled while the record was made, or to verify from a chart of a known region the course travelled. Many other objects and features of the invention will become apparent from the description thereof that follows, wherein reference is made to the accompanying drawings, in which:

Fig. 1 shows partially in an isometric view a schematic arrangement of one embodiment of the invention;

Fig. 1A illustrates the installation of deck and keel transducers aboard a submarine;

Figs. 2 and 3 are samples of two types of records that can be produced with the invention; and Fig. 4 shows a detail of the printer bar shown in Fig. 1.

Referring now to Fig. 1, there is shown a dual recorder constructed in accordance with the invention, comprising a record paper 10 fed from a supply roll 11, which may be tensioned in any well-known manner, and drawn across a printing roller 12 by a take-up roll 13 driven by a motor 14. The supply and take-up rolls 11 and 13 and the motor 14 are all firmly supported on a base or bed plate 5. The paper is furnished with marginal sprocket holes 15 which cooperate with circumferentially arranged sprocket projections 16 at the outer ends of the take-up roll 13. The printing roller 12 is furnished with two reversely wound single spiral turn printing contact blades 17 and 18 which start together at a point 49 at or near the center of the roller and execute one turn each while extending longitudinally one toward each end of the roller. The printing roller is driven by a motor 19 in a direction tending to tension the paper 10 against the take-up roll 13, at a particular desired speed, as will be explained later. Cooperating with the printing roller 12 and the record paper 10 is a pair of printer bars 21 and 22, linked together by a spacer bar 23, shown more clearly in Fig. 4, which is furnished with slots 24 and screws 25 driven into the printer bars to permit the spacing between the printer bars to be altered. The printing roller 12 is supported in a carriage 26 between a pair of upstanding supports 27 and 27' in which the axle 28 thereof is rotatably mounted. The carriage 26 is supported on the bed plate 5 on tracks 6, 6 and arranged to be movable in a direction transverse to the direction of motion of the paper 10, in a manner that will be described in detail below. The printing roller drive motor 19 is also supported on the carriage 26. The printer bars 21 and 22 are together supported on the carriage 26 between another pair of upstanding supports 29 and 30, on which is mounted a pair of flexible printer bar mounting arms 31 and 32, respectively.

The printer bar assembly is attached at the outer ends to the mounting arms, which are each slotted at both ends to permit adjustment of the printer bar assembly both along the axis of the printing roller 12 and transversely thereto. A pair of springs 33 and 34 is mounted one on each support 29 and 30, respectively, and bear downward on the flexible mounting arms 31 and 32, respectively, to urge the printer bars 21 and 22 yieldingly into contact with the paper 10 along the line where it passes over the printing roller 12. Contact between the printing roller and the paper 10 is established, however, only at the points where the spiral-form blades 17 and 18 touch the paper. At these points the paper is marked, as will be explained below, by means of electrical impulses brought to the printer bars 21 and 22 via signal wires 35 and 36. To this end, the printer bars 21 and 22, printing roller 12 and blades 17 and 18 are all electrically conductive, and the printer bar mounting arms 31 and 32 and the spacer bar 23 are made of electrically non-conductive materials. The paper 10 is of a kind that is suitable for marking with small electric currents.

The recorder of Fig. 1 is employed aboard a submarine in cooperation with a pair of underwater sound transducers 41 and 42, of which one is mounted on the deck of the submarine for projecting sound pulses upward toward the surface of the ocean and the other is mounted on the keel for projecting sound pulses downward to the bottom. A suitable disposition of these transducers is shown in Fig. 1A, where the bow N of a submarine is illustrated in elevation and S—S represents the waterline when the submarine is surfaced. H is the height of the deck transducer 42 above and D is the depth of the keel transducer 41 below the waterline, respectively. These two transducers may be driven from a common driver 43 as shown in Fig. 1, and should be separately excited. The operating sound frequencies may be the same or different, for the body of the submarine effectively shields the transducers from each other. The driver is keyed by a keying switch 44 which is mounted on one of the printing roller supports 27 and is actuated by a cam 45 mounted on the corresponding end of the printing roller shaft 28. Thus for an instant at the start of each revolution of the printing roller 12, during which the point 49 between the blades 17 and 18 is about under the printer bar assembly, the switch 44 is momentarily closed to key the driver 43 and causes the two transducers 41 and 42 each to emit a sound pulse. The speed of the printing roller drive motor should be such as to execute one revolution of the printing roller during the time of travel of either sound pulse to the furthest point of the region being explored and back again. During this time, the points of contact between the spiral-form blades 17 and 18 and the paper 10 will travel outwardly in opposite directions toward the respective edges of the paper, each making one complete excursion.

The transducers 41 and 42 function as receiving elements during the listening time, and to this end are connected to a two-channel amplifier 48, which combines economically the functions of two separate amplifiers, and has accordingly two separate output lines 35 and 36, one for the keel transducer and one for the deck transducer respectively. Over these lines the signals received from the bottom and the surface of the ocean are provided to the two printer bars 21 and 22, respectively. The spacer bar 23 is therefore made of insulating material as stated above. The spiral-form blades 17 and 18 are thus intended to record bottom and top conditions, respectively, and the signal that is recorded at or about their junction point 49 each time the driver 43 is keyed represents the approximate mean position, in elevation between the top and bottom of the ocean, of the submarine at the time of keying. To this end the cam 45 is adjusted on the shaft 28 to close the switch 44 at the time when this junction point 49 is in position for the blades 17 and 18 to print closest together on the paper 10.

The motion of the carriage 26 on the tracks 6, 6 is controlled by a depth gauge 50, which may be the depth gauge system of the submarine or an independent system. The depth gauge comprises a Bourdon tube 51 connected through a hull plate 52 with the water outside the submarine. The Bourdon tube 51 is arranged to turn a shaft 53 through a flexible link 54, the angular rotation of the shaft being proportional to the depth of the submarine, or more immediately, to the pressure of the water above the point at which the Bourdon tube pierces the hull plate 52. A weight W is connected to the shaft 53 through a second flexible link 55, and is arranged to apply a constant opposing force to the force of the Bourdon tube, thereby providing a restoring force when the submarine approaches the surface. To this end the links 54 and 55 are, conveniently, wires wound around the shaft 53 in opposite directions and each connected at one end to the shaft and at the other end to the Bourdon tube 51 and the weight W, respectively. The shaft 53 turns the rotor (not shown) of a "Selsyn" or similar type control transformer 56, which is the signal transmitting end of a servo system that includes also a servo-amplifier 57, a servomotor 58, and a "Selsyn" type follower 59. The servomotor 58 drives the carriage 26 along the tracks 6, 6 to position the center point 49 between the edges of the paper 10 at a position corresponding to the depth of the submarine, as will appear in greater detail below. The motor 58 turns a worm 63 which turns a carriage drive gear 64, fixed on an axle 65 of the carriage, and simultaneously turns a gear 61, which rotates a second gear 62, operatively connected to the follower 59. The remaining axle 66 of the carriage 26 is free running. The axles carry four geared wheels 67, which ride on the tracks 6, 6 which are also geared, in the form of a rack. This arrangement provides accurate positioning of the carriage 26 on the base 5. The servomotor 58 and follower 59 are both carried on the carriage 26.

The servo system operates in a well-known fashion to transmit depth information from the depth gauge system 50 to the carriage 26. Alternating current is furnished to the rotor (not shown) of the follower 59 by way of a power line 68, and the difference signal between the follower 59 and the control transformer 56 appears in a second line 69. This difference signal is zero whenever the follower 59 and control transformer 56 have their rotors in corresponding positions, which occurs when the point 49 is at the proper point on the record paper 10 corresponding to the depth of the submarine. When the difference signal in line 69 has a value other than zero, it is amplified in the servo amplifier 57 to which it is fed over a line 71 from the rotor of the control transformer 56. The amplified difference signal is applied to the servomotor 58 over a separate line 72 in the proper sense to move the carriage 26 in the correct direction and simultaneously rotate the rotor of the follower 59 in a direction to reduce the difference signal to zero. This occurs whenever the submarine changes its depth and the shaft 53 is rotated accordingly.

When the submarine is on the surface, the deck transducer 42 is out of water, and should not be operated, as it is impedance matched to water and not to air. Accordingly a dummy load 46, having the proper impedance, is provided, and the signal from the driver 43 is transferred by way of a transfer switch 47 from the deck transducer 42 to the dummy load before the deck transducer emerges from the water. A pressure-operated switch 83, which can be set to operate just prior to the emergence or subsequent to the immersion of the deck transducer from or into the water, controls the position of the transfer switch 47 through a suitable relay 84. Power is furnished to the pressure actuated switch 83 and relay 84 over a suitable power line 85.

Referring now to Fig. 2, there is shown a sample record of an elevation track of a submarine employing the invention. A portion of record paper 10 is shown, on which the surface track 75, representing surface conditions, is made near the top edge. This track is made by spiral blade 18 and printer bar 22 in response to signals furnished by the deck transducer 42 over signal line 36. The bottom track 76 appears nearer the bottom edge of the paper, and is made by the other spiral blade 17 and printer bar 21 in response to signals furnished by the keel transducer 41 over signal line 35. The intermediate track 77 is that of the submarine and is made at the position of the point 49 as determined by the depth gauge 50. The paper moves under the printer bars 21 and 22 and over the printing roller 12 in the direction of the arrow 78, which corresponds to the similarly designated arrow in Fig. 1.

When the recorder is initially adjusted, the submarine's track 77 is made to coincide with the surface track 75 for the surfaced condition of the submarine. Actually this track is set below the surface by an amount equivalent to the height H in Fig. 1A, so that, when the deck transducer 42 becomes operative, the true degree of submergence of the submarine will be indicated. The paper 10 is normally provided with indicia 79 indicative of depth, and these start with "zero" at the surface. As shown in Fig. 2, the indicia are lines showing depth in hundreds of feet. At the right hand side of Fig. 2, the submarine is on the surface, and only the bottom condition is being explored. At point A the submarine commences to execute a dive, which is completed at point B, where the submarine is at approximately 350 feet. The submerged depth of the submarine is directly readable from the record. By arranging to dive the paper take-up motor 14 in Fig. 1 at a speed proportional to the speed of the submarine, the record can be made to provide diving time information, for then distance units in the direction of the arrow 78 are proportional to time.

The depth of water below the submarine may be found by deducting the submarine's depth (track 77) from the bottom depth (track 76). Due to the fact, however, that the two transducers 41 and 42 are located one on the keel and one on the deck, respectively, the depth indicated by the bottom condition track 76 will be in error by the amount (H plus D in Fig. 1A) by which the transducers are separated. That is, the spacing between the submarine's track 77 and each outer track 75 and 76 is accurate, but the sum of the two spacings is deficient as a total depth indication by this amount of separation. The separation is a fixed quantity once the system is installed aboard a particular submarine, and can be added to the bottom track reading to obtain the true depth of the ocean through which the submarine is sailing, and therefrom the actual depth of water beneath the submarine. As a refinement, the recorder can be adjusted specially for each installation to take this fixed quantity into account, and, when it is so adjusted, the record will appear as shown in Fig. 3.

In Fig. 3 there are two tracks 77D and 77K representative of the submarine's position, the upper track 77D being made by the outgoing pulse of the deck transducer 42 and the lower track 77K being made by the outgoing pulse of the keel transducer 41. With the slots 24 of the spacer bar 23 and the cooperative screws 25, the printer bars 21 and 22 may be spaced apart a distance depending on the distance between the transducers, so that the outgoing pulses are printed at about the points 81 and 82 on the spiral blades 17 and 18, respectively. The spacing between the submarine tracks 77D and 77K is then representative of the distance $H+D$ between the two transducers, and thus indicates the vertical thickness of the submarine. If the transducers are properly located, the imaginary center line (not shown) between the two submarine tracks is always at the mean depth of the submarine. The readings of all the tracks are now accurate readings, and the bottom track 76 indicates the true depth of the water.

The total value of $H+D$ is usually of the order of twenty feet, while the chart paper 10 will normally be provided with indicia to record ocean depths of about 700 feet, so that the space between tracks 77D and 77K, representative of $H+D$, is actually relatively small. For the same reason, the correction by the value of H of the submarine's track 77 is relatively small. The lack of these corrections would therefore not seriously reduce the usefulness of a record like that shown in Fig. 2, and not at all for qualitative purposes.

The recorder shown is of the "lawnmover" type, but it will be appreciated that not only can the type shown be varied in many ways within the scope of the invention, but also other types, for example that employing moving styli, can be employed. Likewise the other elements shown may be varied by those skilled in the art. It is accordingly intended that the appended claims shall be given the broadest possible interpretation commensurate with their scope within the art, and shall not be limited by the embodiment of the invention shown and described herein.

Having now described my invention I claim:

1. An underwater echo sounding system for use on a submersible vessel or the like comprising, in combination, two separate upward searching and downward searching means mounted on said vessel for observing the top and bottom of the water, respectively, and a recording device having a single record medium, first and second marking means disposed adjacent said medium, means to move said first marking means across said medium from an intermediate point to one edge thereof, means to move said second marking means across said medium from said point to the opposite edge thereof, means connecting the upward searching means to said first marking means, means connecting the downward searching means to said second marking means, for recording upward and downward search information, respectively.

2. An underwater echo sounding system for use on a submersible vessel or the like comprising, in combination, two separate upward searching and downward searching means mounted on said vessel for observing the top and bottom of the water, respectively, and a recording device having a single record medium, first and second marking means disposed adjacent said medium, means to move said first marking means across said medium from an intermediate point to one edge thereof, means to move said second marking means across said medium from said point to the opposite edge thereof, means connecting the upward searching means to said first marking means, means connecting the downward searching means to said second marking means, for recording upward and downward search information, respectively, the upward search actuator means being constructed and arranged to record the distance to the top in terms of distance from one side of an intermediate point on said paper respresentative of the mean depth of said vessel in the water and the downward search actuator means being constructed and arranged to record the distance to the bottom in terms of distance from the opposite side of said point.

3. An underwater echo sounding system for use on a submersible vessel or the like comprising, in combination, two separate upward searching and downward searching means mounted on the top and bottom, respectively, of said vessel for observing the top and bottom of the water, respectively, a recording device having a single record medium, first and second marking means disposed adjacent said medium, means to move said first marking means across said medium from an intermediate point to one edge thereof, means to move said second marking means across said medium from said point to the opposite edge thereof, means connecting the upward searching means to said first marking means, means connecting the downward searching means to said second marking means, for recording upward and downward search information, respectively, the upward search actuator means being constructed and arranged to record the distance from the upward searching means to the top in terms of distance from one side of an intermediate point on said paper representative of the mean depth of said vessel and the downward search actuator means being constructed and arranged to record the distance from the downward searching means to the bottom in terms of distance from the opposite side of said point and means associated with said actuator means for providing additional separation between the top and bottom records proportional to the actual physical separation of said searching means, whereby the sum of the observations of height of water above and depth of water below the respective searching means plus said separation is the actual depth of the water.

4. An underwater sound system for use on a submersible vessel or the like comprising, in combination, upward searching and downward searching means mounted on said vessel for observing the top and bottom of the water, respectively, a recording device having a single record medium, first and second marking means disposed adjacent said medium, means to move said first marking means across said medium from an intermediate point to one edge thereof, means to move said second marking means across said medium from said point to the opposite edge thereof, means connecting the upward searching means to said first marking means, means connecting the downward searching means to said second marking means, for recording upward and downward search information, respectively, as it is made available, the upward search actuator means being constructed and arranged to record the distance to the top in terms of distance from one side of an intermediate point on said paper representative of the mean depth of said vessel in the water and the downward search actuator means being constructed and arranged to record the distance to the bottom in terms of distance from the opposite side of said point, means continuously to advance said sheet in a direction transverse to the directions from said point in which distance measurements are made at a rate proportional to the speed through the water of said vessel, and means responsive to the depth of the vessel in the water for causing relative movement between the advancing sheet and the record making means in a direction transverse to the direction of advancement to position the intermediate point on the record sheet in accordance with said depth with respect to a straight line on said paper on the side of said point reserved for top observations and thereby to maintain the track of the upward search information substantially in a straight line except for local surface fluctuations.

5. A recorder comprising a record medium, first and second marking means, a common support for said marking means disposing said marking means in marking relation to said medium, means to move said first marking means in said support to traverse said medium in a first path from a region of origin to a first remote point thereon, means to move said second marking means in said support to traverse said medium in a second substantially oppositely directed path from said region of origin to a second remote point thereon, and means to cause relative motion between said support and said medium in a direction parallel to said paths.

6. A recorder comprising a record medium, first and second marking means, a common support for said marking means disposing said marking means in marking relation to said medium, means to move said first marking means in said support to transverse said medium in a first path from a region of origin to a first remote point thereon, means to move said second marking means in said support to traverse said medium in a second substantially oppositely directed path from said region of origin to a second remote point thereon, and means to move said support with respect to said medium in a direction to shift said region toward one of said remote points and simultaneously away from the other.

7. A recorder comprising a record medium, first and second marking means, a common support for said marking means disposing said marking means in marking relation to said medium, means to move said first marking means in said support to traverse said medium in a first path from a region of origin to a first remote point thereon, means to move said second marking means in said support to traverse said medium in a second substantially oppositely directed path from said region of origin to a second remote point thereon, means to move said medium with respect to said supports continuously in a direction substantially transverse to said paths, and means to move said support with respect to said medium in a direction to shift said region toward one of said remote points and simultaneously away from the other.

8. A recorder comprising a record medium, first and second marking means, a common support for said marking means disposing said marking means in marking relation to said medium, means to move said first marking means in said support repetitiously to traverse said medium in a first path from a region of origin to a first remote point thereon, means to move said second marking means in said support repetitiously to traverse said medium in a second substantially oppositely directed path from said region of origin to a second remote point thereon, means to advance said medium with respect to said support in a direction substantially transverse to said paths whereby continuously to provide fresh marking medium, and means to shift said medium with respect to said support in a direction substantially parallel to said paths whereby to alter the position of said region of origin on said medium.

9. A recorder comprising a record medium, first and second marking means, a common support for said marking means disposing said marking means in marking relation to said medium, means to move said first marking means in said support to traverse said medium in a first path from a region of origin to a first remote point thereon, means to move said second marking means in said support to traverse said medium in a second substantially oppositely directed path from said region of origin to a second remote point thereon, and means to adjust the relative positions of said marking means in said support whereby to adjust the dimensions of said region.

10. A recorder comprising a record medium, first and second marking means, a common support for said marking means disposing said marking means in marking relation to said medium, means to move said first marking means in said support repetitiously to traverse said medium in a first path from a region of origin to a first remote point thereon, means to move said second marking means in said support repetitiously to traverse said medium in a second substantially oppositely directed path from said region of origin to a second remote point thereon, means to advance said medium with respect to said support in a direction substantially transverse to said paths whereby continuously to provide fresh marking medium, means to adjust the relative positions of said marking means in said support means whereby to adjust the dimensions of said region, and means to shift said medium with respect to said support in a direction substantially parallel to said paths whereby to alter the position of said region of origin on said medium.

11. A recorder comprising an elongated record medium having a substantially flat marking surface, means to advance said medium in a first direction parallel to said surface and to the direction of elongation thereof, elongated support means for marking devices disposed adjacent said medium in a second direction transverse to said direction of elongation and parallel to said surface, first and second marking devices movably supported in said support means in marking relation to said medium, means to move said first device in said support means from a first point in an intermediate region toward one end thereof along said surface, means to move said second device in said support means from a second point in said intermediate region to the other end thereof, and means to move said support in said second direction with respect to said medium.

12. A recorder comprising a record medium, first and second marking means, a common support for said marking means disposing said marking means in marking relation to said medium, means to move said first marking means in said support repetitiously to traverse said medium in a first path from a region of origin to a first remote point thereon, means to move said second marking means in said support repetitiously to traverse said medium in a second substantially oppositely directed path from said region of origin to a second remote point thereon, means to advance said medium with respect to said support in a direction substantially transverse to said paths whereby continuously to provide fresh marking medium, means to shift said medium with respect to said support in a direction substantially parallel to said paths whereby to alter the position of said region of origin on said medium, and means to alter the effective distance between said first and second marking means in said support.

13. A recorder comprising a record medium, first and second marking means, a common support for said marking means disposing said marking means in marking relation to said medium, common means to move said first marking means in said support to traverse said medium in a first path from a region of origin to a first remote point thereon and to move said second marking means in said support to traverse said medium in a second substantially oppositely directed path from said region of origin to a second remote point thereon, and means to cause relative motion between said medium and said support.

14. A recorder comprising an elongated sheet-like record medium having a substantially flat marking surface, an elongated cylinder rotatably supported adjacent said medium in a first direction transverse to the direction of elongation and parallel to the surface of said medium, said cylinder having a length at least twice the width of said medium in said first direction, first and second ridges mounted on said cylinder, said first ridge being spirally wound in one direction from a point on said cylinder intermediate the ends toward one end and said second ridge being spirally wound in the opposite direction from said point to the other end of said cylinder, said ridges each being at one point in contact with a first side of said medium, first and second straight elongated bars disposed collinearly parallel to the axis of said cylinder in contact with the second side of said medium directly opposite said ridges, means to rotate said cylinder, means to advance said medium relative to said cylinder and bars in a second direction parallel to said surface and to the direction of elongation of said medium, means to impress a first medium marking signal between said cylinder and said first bar, and means to impress a medium marking signal between said cylinder and said second bar.

15. A recorder comprising an elongated sheet-like record medium having a substantially flat marking surface, an elongated cylinder rotatably supported adjacent said medium in a first direction transverse to the direction of elongation and parallel to the surface of said medium, said cylinder having a length at least twice the width of said medium in said first direction, first and second ridges mounted on said cylinder, said first ridge being spirally wound in one direction from a point on said cylinder intermediate the ends toward one end and said second ridge being spirally wound in the opposite direction from said point to the other end of said cylinder, said ridges each being at one point in contact with a first side of said medium, first and second straight elongated bars disposed collinearly parallel to the axis of said cylinder in contact with the second side of said medium directly opposite said ridges, rigid means to join the confronting ends of said bars with a prescribed space between them, means to rotate said cylinder, means to advance said medium relative to said cylinder and bars in a second direction parallel to said surface and to the direction of elongation of said medium, means to impress a first medium marking signal between said cylinder and said first bar, and means to impress a medium marking signal between said cylinder and said second bar, said joining means being constructed to inhibit the passage of a signal from one bar to the other.

16. A recorder comprising an elongated sheet-like record medium having a substantially flat marking surface, an elongated cylinder rotatably supported adjacent said medium in a first direction transverse to the direction of elongation and parallel to the surface of said medium, said cylinder having a length at least twice the width of said medium in said first direction, first and second ridges mounted on said cylinder, said first ridge being spirally wound in one direction from a point on said cylinder intermediate the ends toward one end and said second ridge being spirally wound in the opposite direction from said point to the other end of said cylinder, said ridges each being at one point in contact with a first side of said medium, first and second straight elongated bars disposed collinearly parallel to the axis of said cylinder in contact with the second side of said medium directly opposite said ridges, means to rotate said cylinder, means to advance said medium relative to said cylinder and bars in a second direction parallel to said surface and to the direction of elongation of said medium, and means to move said cylinder and bars as a unit in said first direction with respect to said medium.

17. In an underwater echo sounding system wherein the top and the bottom of the water are both under observation from a region in the water, a recorder for top and bottom distance observations comprising a single record medium, first and second marking means, a common support for said marking means disposing said marking means in marking relation to said medium, means to move said first marking means in said support to traverse said medium in a first path from a region of origin to a first remote point thereon, means to move said second marking means in said support to traverse said medium in a second substantially oppositely directed path from said region of origin to a second remote point thereon, means to furnish signals corresponding to top and bottom distance information to said first and second marking means, respectively, and means to cause relative motion between said support and said medium in a direction parallel to said paths.

18. In an underwater echo sounding system wherein the top and the bottom of the water are both under observation from a region in the water, a recorder for top and bottom distance observations comprising a single record medium, first and second marking means, a common support for said marking means disposing said marking means in marking relation to said medium, means to move said first marking means in said support to traverse said medium in a first path from a region of origin to a first remote point thereon, means to move said second marking means in said support to traverse said medium in a second substantially oppositely directed path from said region of origin to a second remote point thereon, means to furnish signals corresponding to top and bottom distance information to said first and second marking means, respectively, means to cause relative motion between said support and said medium in a direction parallel to said paths and means to move said medium with respect to said support continuously in a direction substantially transverse to said paths.

19. In an underwater echo sounding sytem wherein the top and the bottom of the water are both under observation from a region in the water, a recorder for top and bottom distance observations comprising a single record medium, first and second marking means, a common support for said marking means disposing said marking means in marking relation to said medium, means to move said first marking means in said support to traverse said medium in a first path from a region of origin to a first remote point thereon, means to move said second marking means in said support to traverse said medium in a second substantially oppositely directed path from said region of origin to a second remote point thereon, means to furnish signals corresponding to top and bottom distance information to said first and second marking means, respectively, and means responsive to the depth of the system in the water to move said support with respect to said medium in a direction to shift said region toward one of said remote points and simultaneously away from the other.

20. In an underwater echo sounding system wherein the top and the bottom of the water are both under observation from a region in the water, a recorder for top and bottom distance observations comprising a single record medium, first and second marking means, a common support for said marking means disposing said marking means in marking relation to said medium, means to move said first marking means in said support to traverse said medium in a first path from a region of origin to a first remote point thereon, means to move said second marking means in said support to traverse said medium in a second substantially oppositely directed path from said region of origin to a second remote point thereon, means to furnish signals corresponding to top and bottom distance information to said first and second marking means, respectively, means to move said medium with respect to said support continuously in a direction substantially transverse to said paths, and means responsive to the depth of the system in the water to move said support with respect to said medium in a direction to shift said region toward one of said remote points and simultaneously away from the other.

21. In an underwater echo sounding system wherein the top and the bottom of the water are both under observation from a region in the water, a recorder for top and bottom distance observations comprising a single record medium, first and second marking means, a common support for said marking means disposing said marking means in marking relation to said medium, means to move said first marking means in said support to traverse said medium in a first path from a region of origin to a first remote point thereon, means to move said second marking means in said support to traverse said medium in a second substantially oppositely directed path from said region of origin to a second remote point thereon, means to furnish signals corresponding to top and bottom distance information to said first and second marking means, respectively, said system including first and second transducers of which the first is aimed upward and the second downward, and signal connections from said first transducer to said first marking means and from said second transducer to said second marking means.

22. In an underwater echo sounding system wherein the top and the bottom of the water are both under observation from a region in the water, a recorder for top and bottom distance observations comprising a single record medium, first and second marking means, a common support for said marking means disposing said marking means in marking relation to said medium, means to move said first marking means in said support to traverse said medium in a first path from a region of origin to a first remote point thereon, means to move said second marking means in said support to traverse said medium in a second substantially oppositely directed path from said region of origin to a second remote point thereon, means to furnish signals corresponding to top and bottom distance information to said first and second marking means, respectively, said system including first and second transducers of which the first is aimed upward and the second downward, signal connections from said first transducer to said first marking means and from said second transducer to said second marking means, and means on said support to adjust the separation between said marking means thereon in accordance with the distance between said transducers.

23. An underwater echo sounding system for use on a submersible vessel or the like comprising, in combination, two separate upward searching and downward searching means mounted on said vessel for observing the top and bottom of the water, respectively, a recording device having a single record medium, first and second marking means disposed adjacent said medium, means to move said first marking means across said medium from an intermediate point to one edge thereof, means to move said second marking means across said medium from said point to the opposite edge thereof, means connecting the upward searching means to said first marking means, means connecting the downward searching means to said second marking means, for recording upward and downward search information, respectively, and means responsive to the depth of said vessel in the water to move said marking means as a unit with respect to said medium in a direction substantially parallel to the motion of said marking means across said medium, whereby to shift said point on said medium in accordance with said depth.

24. An underwater echo sounding system for use on a submersible vessel or the like comprising, in combination, two separate upward searching and downward searching means mounted on said vessel for observing the top and bottom of the water, respectively, a recording device having a single record medium, first and second marking means disposed adjacent said medium, means to move said first marking means across said medium from an intermediate point to one edge thereof, means to move said second marking means across said medium from said point to the opposite edge thereof, means connecting the upward searching means to said first marking means, means connecting the downward searching means to said second marking means, for recording upward and downward search information, respectively, and means continuously to advance said medium in a direction transverse to the direction of motion of said marking means across said medium.

25. An underwater echo sounding system for use on a submersible vessel or the like comprising, in combination, two separate upward searching and downward searching means mounted on said vessel for observing the top and bottom of the water, respectively, a recording device having a single record medium, first and second marking means disposed adjacent said medium, means to move said first marking means across said medium from an intermediate point to one edge thereof, means to move said second marking means across said medium from said point to the opposite edge thereof, means connecting the upward searching means to said first marking means, means connecting the downward searching means to said second marking means, for recording upward and downward search information, respectively, means responsive to the depth of said vessel in the water to move said marking means as a unit with respect to said medium in a direction substantially parallel to the motion of said marking means across said medium, whereby to shift said point on said medium in accordance with said depth, and means continuously to advance said medium in a direction transverse to the direction of motion of said marking means across said medium.

WILLIAM H. RYMES.

REFERENCES CITED

The following references are of record in the file of this patent:

UNITED STATES PATENTS

| Number | Name | Date |
|---|---|---|
| 500,775 | Parenthou | July 4, 1893 |
| 1,411,698 | Hepler | Apr. 4, 1922 |
| 1,850,978 | Sperry | Mar. 22, 1932 |
| 1,961,767 | Key | June 5, 1934 |
| 2,072,950 | Huber | Mar. 9, 1937 |
| 2,143,376 | Hansell | Jan. 10, 1939 |
| 2,148,188 | Chappell et al. | Feb. 21, 1939 |
| 2,233,992 | Wyckoff | Mar. 4, 1941 |
| 2,250,509 | Turner, Jr. | July 29, 1941 |
| 2,384,722 | Blain | Sept. 11, 1945 |
| 2,433,382 | Morrison | Dec. 30, 1947 |
| 2,437,242 | Cole et al. | Mar. 9, 1948 |
| 2,441,065 | Green | May 4, 1948 |